United States Patent
Chun et al.

[19]

[11] Patent Number: 6,092,134
[45] Date of Patent: Jul. 18, 2000

[54] METHOD AND APPARATUS FOR LOCKING OUT A PROCESSOR IN A COMPUTER SYSTEM WITH A BUS THAT IS IMPROPERLY TERMINATED

[75] Inventors: Collier S. Chun, Aloha; Tom M. Skoric, Beaverton, both of Oreg.

[73] Assignee: Intel Corporation, Santa Clara, Calif.

[21] Appl. No.: 09/083,325

[22] Filed: May 21, 1998

[51] Int. Cl.[7] .............................. G06F 13/00; G06F 11/07
[52] U.S. Cl. ........................... 710/102; 713/300; 714/43; 326/30
[58] Field of Search .................................. 710/100–104; 713/300–340, 600–601; 714/10–14, 22–24, 43, 56; 326/30

[56] References Cited

U.S. PATENT DOCUMENTS

| | | | |
|---|---|---|---|
| 5,132,635 | 7/1992 | Kennedy ................................. | 324/763 |
| 5,297,272 | 3/1994 | Lu et al. ................................ | 710/129 |
| 5,469,554 | 11/1995 | Tucker et al. .......................... | 711/210 |
| 5,586,270 | 12/1996 | Rotier et al. ........................... | 710/102 |
| 5,594,879 | 1/1997 | Belmont ................................. | 710/129 |
| 5,734,208 | 3/1998 | Jones ..................................... | 307/139 |
| 5,761,479 | 6/1998 | Huang et al. .......................... | 710/102 |
| 5,796,185 | 8/1998 | Takata et al. .......................... | 307/140 |
| 5,805,903 | 9/1998 | Elkhoury ................................ | 713/300 |
| 5,845,134 | 12/1998 | Arai ....................................... | 713/322 |

*Primary Examiner*—Glenn A. Auve
*Assistant Examiner*—Sumati Lefkowitz
*Attorney, Agent, or Firm*—Blakely, Sokoloff, Taylor & Zafman LLP

[57] ABSTRACT

A computer system includes a bus. A first connector is coupled to the bus. A first processor is coupled to the first connector. A second connector is coupled to the bus. A lock-out unit is coupled to the first and second connectors. The lock-out unit disables the first processor in response to a slot occupation signal that indicates when one of a second processor and a termination card is not coupled to the second connector. By disabling the first processor when a termination card or processor does not occupy one of the slots, data corruption due to improper bus termination is prevented.

22 Claims, 8 Drawing Sheets

METHOD AND APPARATUS FOR LOCKING OUT A PROCESSOR IN A COMPUTER SYSTEM WITH A BUS THAT IS IMPROPERLY TERMINATED

FIELD OF THE INVENTION

The present invention relates to computer systems. More specifically, the present invention relates to a method and apparatus for locking out a processor in a computer system with a bus that is improperly terminated.

BACKGROUND OF THE INVENTION

High speed buses such as the Gunning Transceiver Logic Plus (GTL+) bus (Pentium Pro Family Developers Manual, Volume 1 Specification, published 1996) require the use of resistors at the physical ends of its electrical traces to properly terminate the bus. The resistors provide an electrical pull-up function and act as a lumped impedance load to minimize signal reflections off the ends of the traces. If a GTL+ bus is operated with only one end of its traces terminated, the reliability of the computer system in which it is implemented in can be severely degraded. While a computer system may seem to be operating normally with an improperly terminated GTL+ bus, it is possible for data to be irreversibly corrupted without warning.

The Pentium® II processor incorporates GTL+ bus termination resistors within the Single Edge Connector (SEC) cartridge enclosing the processor. A computer system designed to use two Pentium II processors is designed with the Slot 1 connectors located at the physical ends of each GTL+ bus trace. Therefore, when two processors are installed in a dual Slot 1 system, each trace on the GTL+ bus is properly terminated via the termination resistors in the SEC cartridges, and reliable system operation is assured.

While a computer system may be designed to accommodate two Pentium II processors, reliable system operation with only one processor installed is possible with the use of a termination card. A termination card is a circuit board with a gold finger edge connector which mates with a Slot 1 connector. A termination card contains the necessary pull-up/termination resistors to properly terminate GTL+ bus signals. A termination card may be installed in a Slot 1 connector in place of a processor to provide the pull-up and termination normally supplied by the second SEC cartridge. The termination card must be installed in the unused Slot 1 connector to maintain the design quality of the signals on the GTL+ bus. Without it, system operation may be unreliable.

SUMMARY

A computer system is disclosed. The computer system includes a bus. A first connector is coupled to the bus. A first processor is coupled to the first connector. A second connector is coupled to the bus. A lock-out unit is coupled to the first and second connectors. The lock-out unit effectuates a shut down of the first processor in response to a slot occupation signal that indicates when one of a second processor and a termination card is not coupled to the second connector.

BRIEF DESCRIPTION OF THE DRAWINGS

The present invention is illustrated by way of example and not by way of limitation in the figures of the accompanying drawings, in which the like references indicate similar elements in and in which.

DETAILED DESCRIPTION

Figure 1:
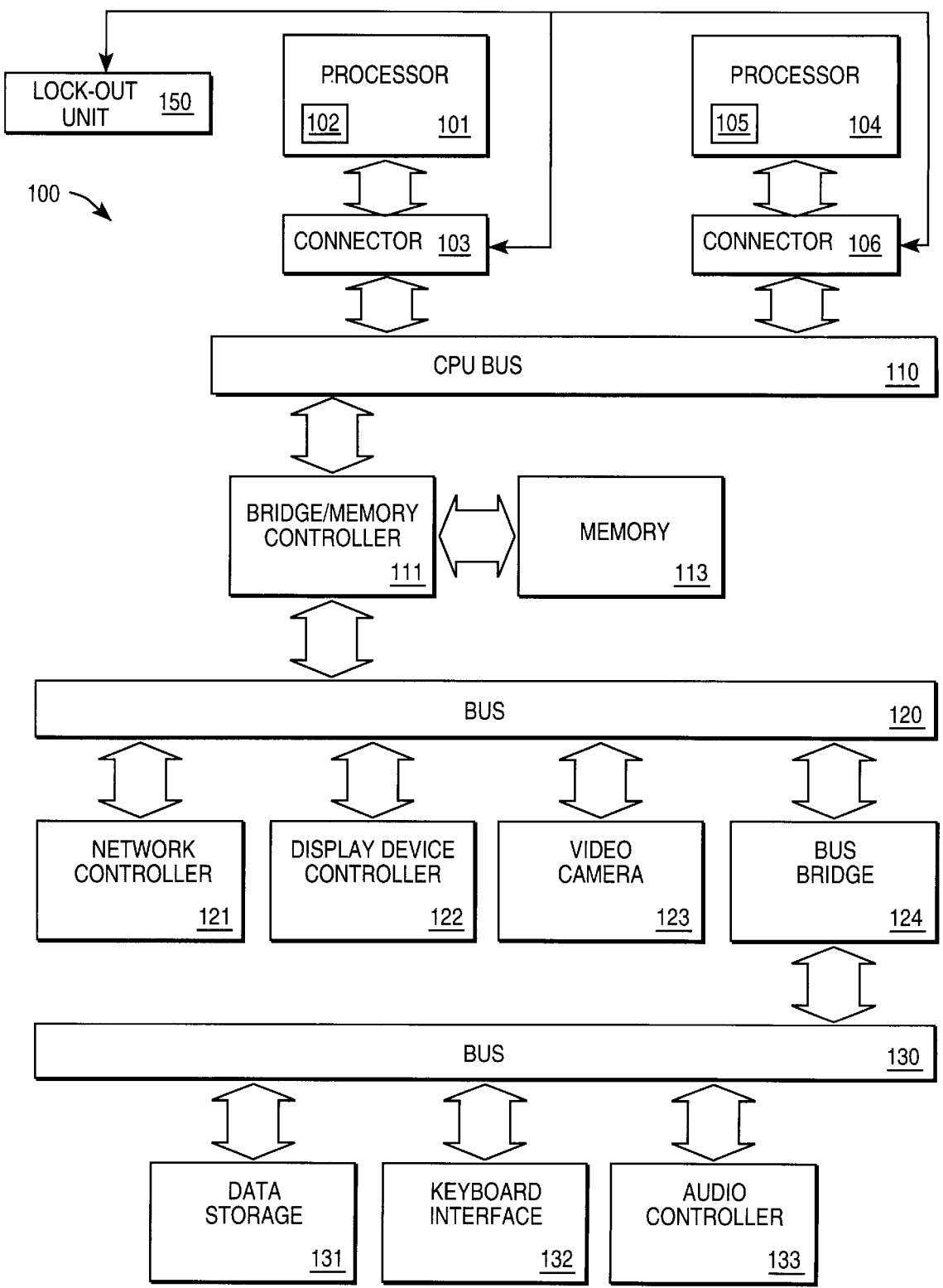
FIG. 1 is a block diagram of a computer system implementing an embodiment of the present invention.

FIG. 1 illustrates a computer system 100 upon which an embodiment of the present invention can be implemented. The computer system 100 includes a CPU bus 110. A first slot connector 103 and a second slot connector 106 are coupled to the CPU bus 110. The first and second slot connectors 103 and 106 may operate to connect processors to the CPU bus 110. According to an embodiment of the present invention, the computer system 100 includes a processor 101 that may be connected to the CPU bus 110 via the first slot connector 103 and a processor 104 that may be connected to the CPU bus 110 via the second slot connector 106. The processors 101 and 104 process data signals. The processors 101 and 104 may be complex instruction set computer (CISC) microprocessors, reduced instruction set computing (RISC) microprocessors, very long instruction word (VLIW) microprocessors, processors implementing a combination of instruction sets, or other processor devices. The processors 101 and 104 transmit data signals to other components in the computer system 100 via the CPU bus 110. According to an embodiment of the computer system 100, the processor 101 and the processor 104 are implemented in processor cartridges where each of the processors 101 and 104 include bus termination circuitry that properly terminate the traces (not shown) on each end of the CPU bus 110. It should be appreciated that other connector devices may be used in place of the first and second slot connectors 103 and 106.

According to an embodiment of the present invention, a termination card (not shown) may be coupled to either one of the first connector 103 or the second connector 106 in place of one of the processors 101 and 104. The termination card includes termination circuitry that properly terminates traces on the CPU bus 110.

A lock-out unit 150 is coupled to the first slot connector 103 and the second slot connector 106. The lock-out unit 150 operates to detect when either the first slot connector 103 or the second slot connector 106 is vacant. When one of the slot connectors 103 and 106 is not connected to either a processor or a termination card, the lock-out unit 150 effectuates a shut down of the remaining processor in the computer system 100. By effectuating a shut down of the remaining processor in the computer system 100, the lock-out unit 150 prevents the computer system 100 from operating in a state where data may be irreversibly corrupted by reflections on an improperly terminated CPU bus 110. FIG. 1 shows an example of the present invention implemented on a dual processor computer system 100. However, it is understood that the present invention may be implemented in a computer system having any number of slot connectors and processors.

According to an embodiment of the computer system 100, processors 101 and 104 are Pentium II Processors, the first slot connector 103 and the second slot connector 106 are Slot 1 connectors, and the CPU bus 110 is a GTL+ bus.

The computer system 100 includes a memory 113. The memory 113 may be a dynamic random access memory (DRAM) device, a synchronous dynamic random access memory (SDRAM) device, or other memory device. The memory 113 may store instructions and code represented by data signals that may be executed by the processor 101. According to an embodiment of the computer system 100, the memory 113 includes a memory system having a plurality of memory modules. Each of the memory modules includes a printed circuit board having a plurality of memory devices mounted on the printed circuit board. The printed circuit board operates as a daughter card insertable into a socket connector that is connected to the computer system 100.

A cache memory 102 resides inside processor 101 and a cache memory 105 resides inside processor 104. The cache memories 102 and 105 store data signals stored in memory 113. The cache memories 102 and 105 speed up memory accesses by the processors 101 and 104 by taking advantage of its locality of access. In an alternate embodiment of the computer system 100, the cache memories 102 and 105 reside external to the processor 101.

A bridge memory controller 111 is coupled to the CPU bus 110 and the memory 113. The bridge memory controller 111 directs data signals between the processor 101, the memory 113, and other components in the computer system 100, and bridges the data signals between the CPU bus 110, the memory 113, and a first I/O bus 120.

The first I/O bus 120 may be a single bus or a combination of multiple buses. As an example, the first I/O bus 120 may comprise a Peripheral Component Interconnect (PCI) bus, a Personal Computer Memory Card International Association (PCMCIA) bus, a NuBus, or other buses. The first I/O bus 120 provides communication links between components in the computer system 100. A network controller 121 is coupled to the first I/O bus 120. The network controller 121 links the computer system 100 to a network of computers (not shown in FIG. 1) and supports communication among the machines. A display device controller 122 is coupled to the first I/O bus 120. The display device controller 122 allows coupling of a display device (not shown) to the computer system 100 and acts as an interface between the display device and the computer system 100. The display device controller 122 may be a monochrome display adapter (MDA) card, a color graphics adapter (CGA) card, an enhanced graphics adapter (EGA) card, an extended graphics array (XGA) card or other display device controller. The display device may be a television set, a computer monitor, a flat panel display or other display device. The display device receives data signals from the processor 101 through the display device controller 122 and displays the information and data signals to the user of the computer system 100. A video camera 123 is coupled to the first I/O bus 120.

A second I/O bus 130 may be a single bus or a combination of multiple buses. As an example, the second I/O bus 130 may comprise a PCI bus, a PCMCIA bus, a NuBus, an Industry Standard Architecture (ISA) bus, or other buses. The second I/O bus 130 provides communication links between components in the computer system 100. A data storage device 131 is coupled to the second I/O bus 130. The data storage device 131 may be a hard disk drive, a floppy disk drive, a CD-ROM device, a flash memory device or other mass storage device. A keyboard interface 132 is coupled to the second I/O bus 130. The keyboard interface 132 may be a keyboard controller or other keyboard interface. The keyboard interface 132 may be a dedicated device or can reside in another device such as a bus controller or other controller. The keyboard interface 132 allows coupling of a keyboard (not shown) to the computer system 100 and transmits data signals from a keyboard to the computer system 100. An audio controller 133 is coupled to the second I/O bus 130. The audio controller 133 operates to coordinate the recording and playing of sounds is also coupled to the I/O bus 130.

A bus bridge 124 couples the first I/O bus 120 to the second I/O bus 130. The bus bridge 124 operates to buffer and bridge data signals between the first I/O bus 120 and the second I/O bus 130.

Figure 2:
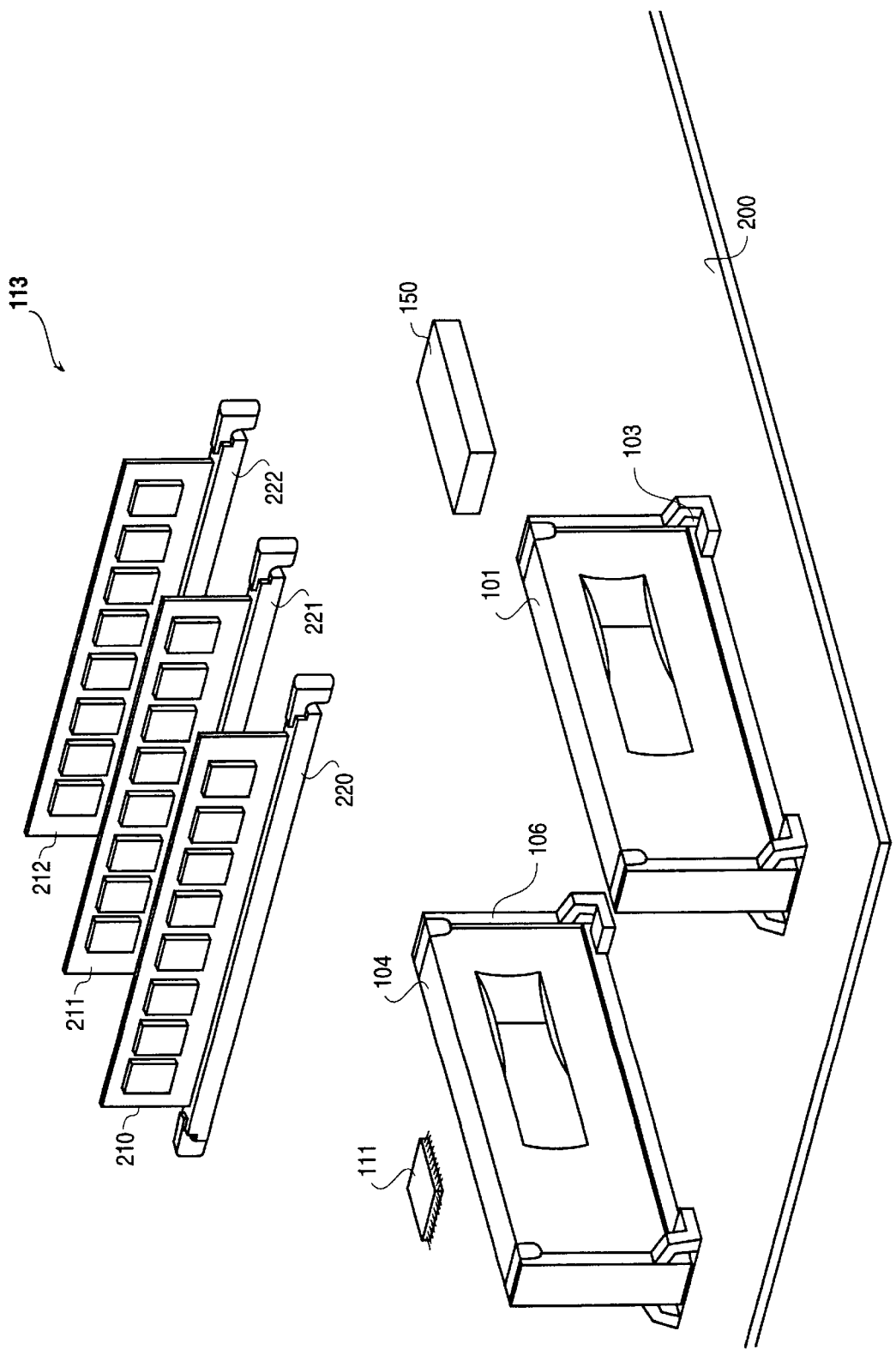
FIG. 2 illustrates a lock-out unit on a motherboard according to an embodiment of the present invention.

FIG. 2 illustrates the lock-out circuit 150 implemented on a motherboard 200 according to an embodiment of the present invention. The motherboard 200 is a printed circuit board that interconnects components of the computer system 100 (shown in FIG. 1). The bridge memory controller 111 and the memory system 113 are coupled to the motherboard 200. The memory system includes a plurality of socket connectors 220–222 mounted on the motherboard 200. The memory system 113 includes a plurality of memory modules 210–212. Each of the memory modules includes a plurality of memory devices mounted on the memory module. The memory modules 210–212 are insertable into the socket connectors 220–222. Electrical connectors (not shown) on the memory module interface with electrical contacts (not shown) on the socket connector. The electrical connectors and the electrical contacts allow components on the motherboard 200 to access the memory devices on the memory module.

The first slot connector 103 and the second slot connector 106 are mounted on the motherboard 200. The processor 101 may be connected to the motherboard 200 via the first slot connector 103. The processor 104 may be connected to the motherboard 200 via the second slot connector 106. Alternatively, a termination card (not shown) may be inserted into either the first slot connector 103 or the second slot connector 106.

The lock-out unit 150 is electrically connected to the motherboard 200. According to an embodiment of the present invention, the lock-out unit 150 is an integrated circuit mounted on the motherboard 200. According to a preferred embodiment of the present invention, the lock-out unit 150 includes electronic circuitry fabricated on the motherboard 200. It should be appreciated that the lock-out unit 150 may be electrically connected to the motherboard 200 using any known circuitry or technique.

Figure 3:
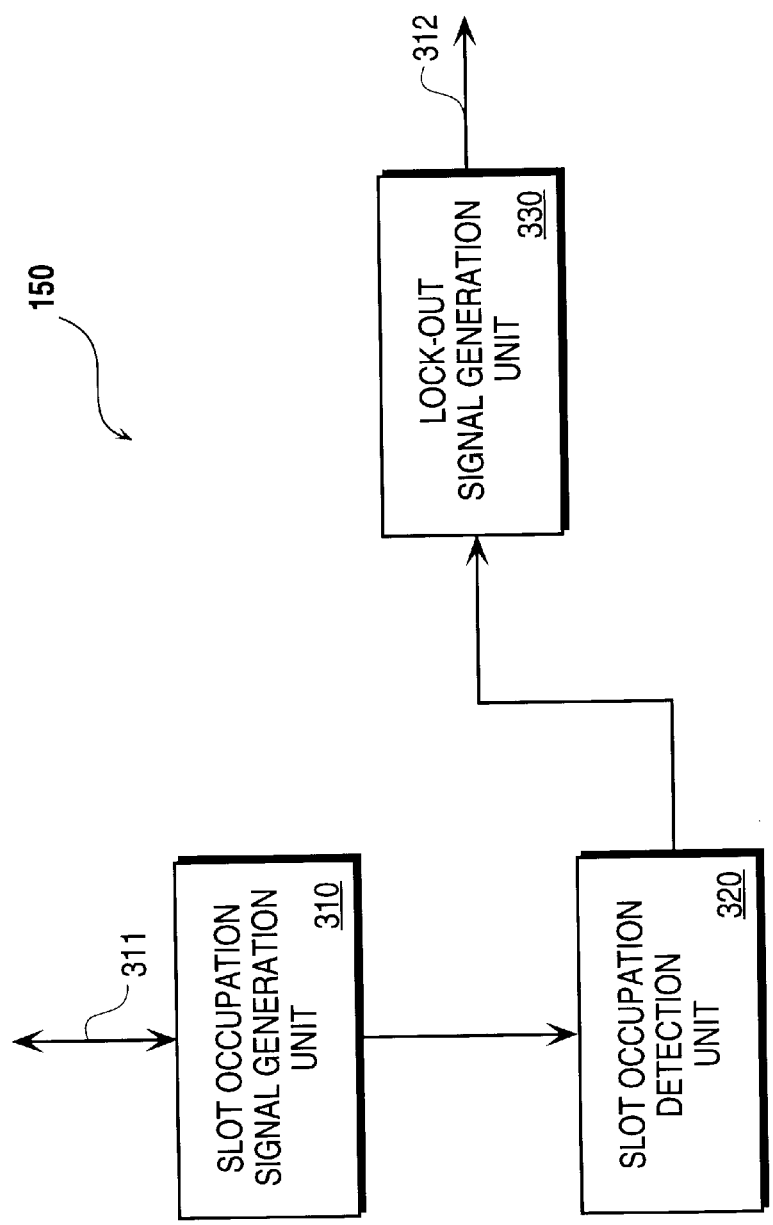
FIG. 3 is a block diagram of a lock-out unit according to an embodiment of the present invention.

FIG. 3 is a block diagram of a lock-out unit 150 according to an embodiment of the present invention. The lock-out unit 150 includes a slot occupation signal generation unit 310. The slot occupation signal generation unit 310 generates a slot occupation signal for each slot connector in the computer system 100 (shown in FIG. 1). Each slot connector in the computer system 100 is connected to the slot occupation signal generation unit 310 via a corresponding slot occupation connection. Line 311 in FIG. 3 illustrates a plurality of slot occupation connections 311 that connects the slot occupation signal generation unit 310 to a plurality of slot connectors. According to an embodiment of the present invention, a first slot occupation connection transmits a first slot occupation signal from the slot occupation signal generation unit 310 to the first slot connector 103 (shown in FIG. 1). The first slot connector 103 returns the first slot occupation signal back to the slot occupation signal generation unit 310 on the first slot occupation connection. The first slot occupation signal corresponds to a state of whether the first slot connector 103 is occupied by a processor or a termination card or whether the first slot connector 103 is vacant. According to an embodiment of the present invention, the slot occupation signal generation unit 310 generates a first slot occupation signal to the first slot connector 103 on the first slot occupation connection that is a high signal. The first slot connector 103 returns a low signal to the slot occupation signal generation unit 310 when the first slot connector 103 is occupied and returns a high signal to the slot occupation signal generation unit 310 when it is vacant.

Similarly, a second slot occupation connection transmits a second slot occupation signal from the slot occupation signal generation unit 310 to the second slot connector 106 (shown in FIG. 1). The second slot connector 106 returns the second slot occupation signal back to the slot occupation signal generation unit 310 on the second slot occupation connection. The second slot occupation signal corresponds to a state of whether the second slot connector 106 is occupied by a processor or a termination card or whether the second slot connector 106 is vacant. According to an embodiment of the present invention, the slot occupation signal generation unit 310 generates a second slot occupation signal to the second slot connector 106 on the second slot occupation connection that is a high signal. The second slot connector 106 returns a low signal to the slot occupation signal generation unit 310 when the second slot connector 106 is occupied and returns a high signal to the slot occupation signal generation unit 310 when it is vacant.

A slot occupation detection unit 320 is coupled to the slot occupation signal generation unit 310. The slot occupation detection unit 320 receives the first and second slot occupation signals corresponding to the first and second slot connectors 103 and 106 from the slot occupation signal generation unit 310 and determines whether one of the slot connectors 103 and 106 is vacant from the first and second slot occupation signals.

A lock-out signal generation unit 330 is coupled to the slot occupation detection unit 320. Each slot connector in the computer system 100 is connected to the lock-out signal generation unit 330 via a lock-out connection. Line 312 in FIG. 3 illustrates a plurality of lock-out connections. The lock-out signal generation unit 330 generates a lock-out signal in response to the slot occupation detection unit 320 that is transmitted to the non-vacant slot connector via its corresponding lock-out connection. The lock-out signal is transmitted to the processor connected to the non-vacant slot connector to effectuate a shut down of the processor.

The slot occupation signal generation unit 310, the slot occupation detection unit 320, and the lock-out signal generation unit 330 may be implemented using any known circuitry or technique. It should be appreciated FIG. 3 illustrates only one embodiment of the lock-out unit 150 and that the components in the lock-out unit may be connected together in other combinations.

Figure 4:
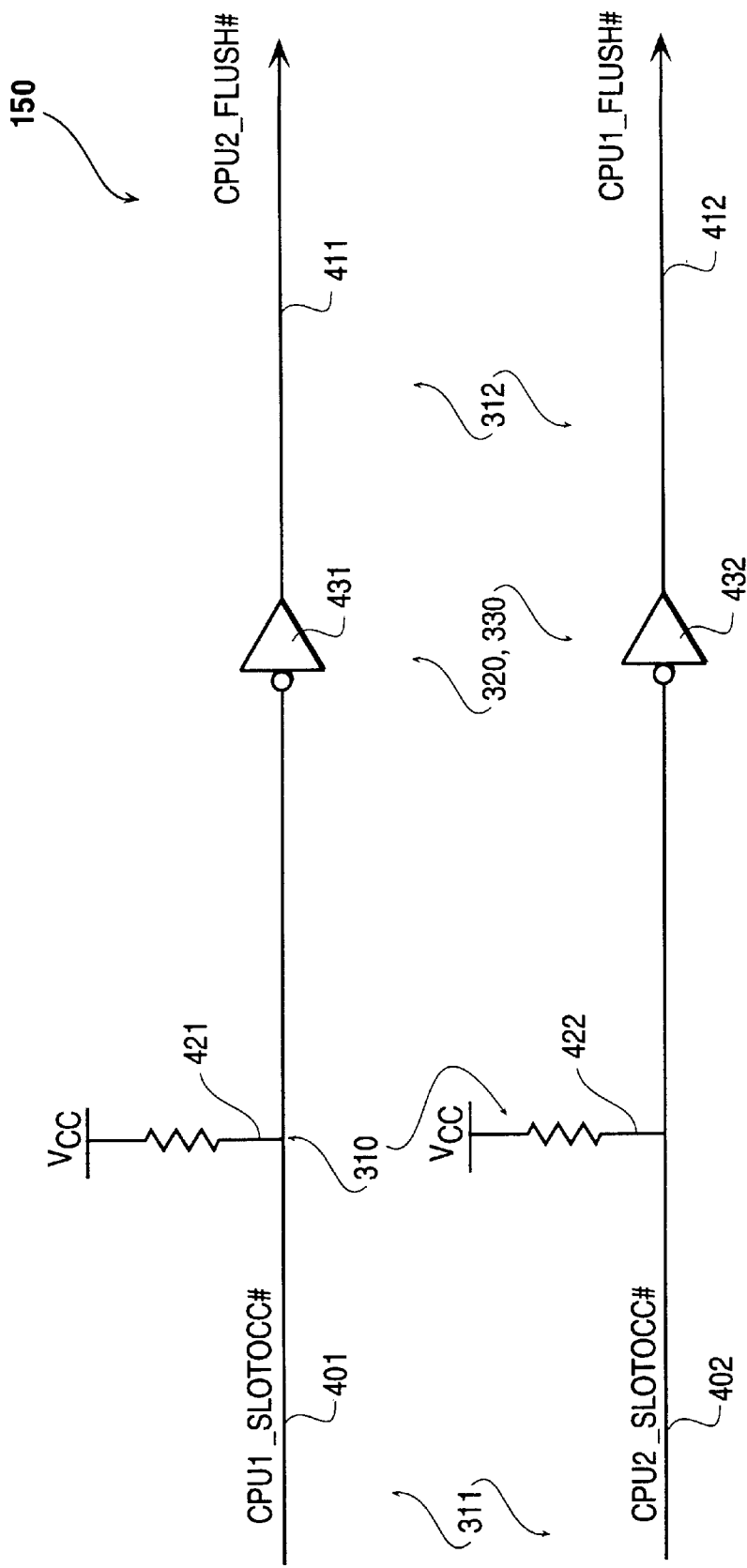
FIG. 4 illustrates a lock-out unit according to an embodiment of the present invention.

FIG. 4 illustrates the lock-out unit 150 according to an embodiment of the present invention. The lock-out unit 150 includes a slot occupation signal generation unit 310 that generates a slot occupation signal. The slot occupation signal generation unit 310 includes a first pull-up resistor 421 connected to Vcc and a second pull-up resistor 422 connected to Vcc.

The slot occupation signal generation unit 310 is connected to the first slot connector 103 and the second slot connector 106 (shown in FIGS. 1 and 2) via the slot occupation connections 311. The slot occupation connections 311 include a first slot occupation connection 401 that connects the first pull-up resistor 421 to the first slot connector 103. The first slot occupation connection 401 transmits a CPU1_SLOTOCC# signal to the first slot connector 103. The CPU1_SLOTOCC# signal transmitted to the first slot connector 103 is a high signal. The first slot connector 103 returns a low signal on the first slot occupation connection 401 when the first slot connector 103 is occupied and returns a high signal when it is vacant. The slot occupation connections 311 include a second slot occupation connection 402 that connects the second pull-up resistor 422 to the second slot connector 106. The second slot occupation connection 402 transmits a CPU2_SLOTOCC# signal to the second slot connector 106. The CPU2_SLOTOCC# signal transmitted to the second slot connector 106 is a high signal. The second slot connector 106 returns a low signal on the second slot occupation connection 402 when the second slot connector 106 is occupied and returns a high signal when it is vacant.

The lock-out unit 150 includes a slot occupation detection unit 320 and a lock-out signal generation unit 330. According to an embodiment of the lock-out unit 150, the slot occupation detection unit 320 and the lock-out signal generation unit 330 are implemented with a plurality of inverters 431 and 432. A first inverter 431 is coupled to the first slot occupation connection 401 and the first pull-up resistor 421. The first inverter 431 generates a low signal when the CPU1_SLOTOCC# signal is high indicating that the first slot connector 103 is vacant and generates a high signal when the CPU1_SLOTOCC# signal is low indicating that the first slot connector 103 is occupied. A second inverter 432 is coupled to the second slot occupation connection 402 and the second pull-up resistor 422. The second inverter 432 generates a low signal when the CPU2_SLOTOCC# signal is high indicating that the second slot connector 106 is vacant and generates a high signal when the CPU2_SLOTOCC# signal is low indicating that the second slot connector 106 is occupied.

The lock-out connections 312 include a first lock-out connection 411 that connects the first inverter 431 to the second slot connector 106 and a second lock-out connection 412 that connects the second inverter 432 to the first slot connector 103. The first lock-out connection 411 transmits a lock-out signal generated by the first inverter 431 to the second processor 104 via the second slot connector 106. The lock-out signal effectuates a shut down of the second processor 104. The second lock-out connection 412 transmits a lock-out signal generated by the second inverter 432 to the first processor 101 via the first slot connector 103. The lock-out signal effectuates a shut down of the first processor 101. According to an embodiment of the present invention, the lock-out signals are low signals transmitted to a pin in the processors 101 and 104 that correspond to a FLUSH# signal. It should be appreciated that the lock-out connections 312 may also transmit lock-out signals to pins corresponding to STOPCLK# signals or any other signals in the processors 101 and 104 that operate to disable or shut the processors 101 and 104 down.

Figure 5:
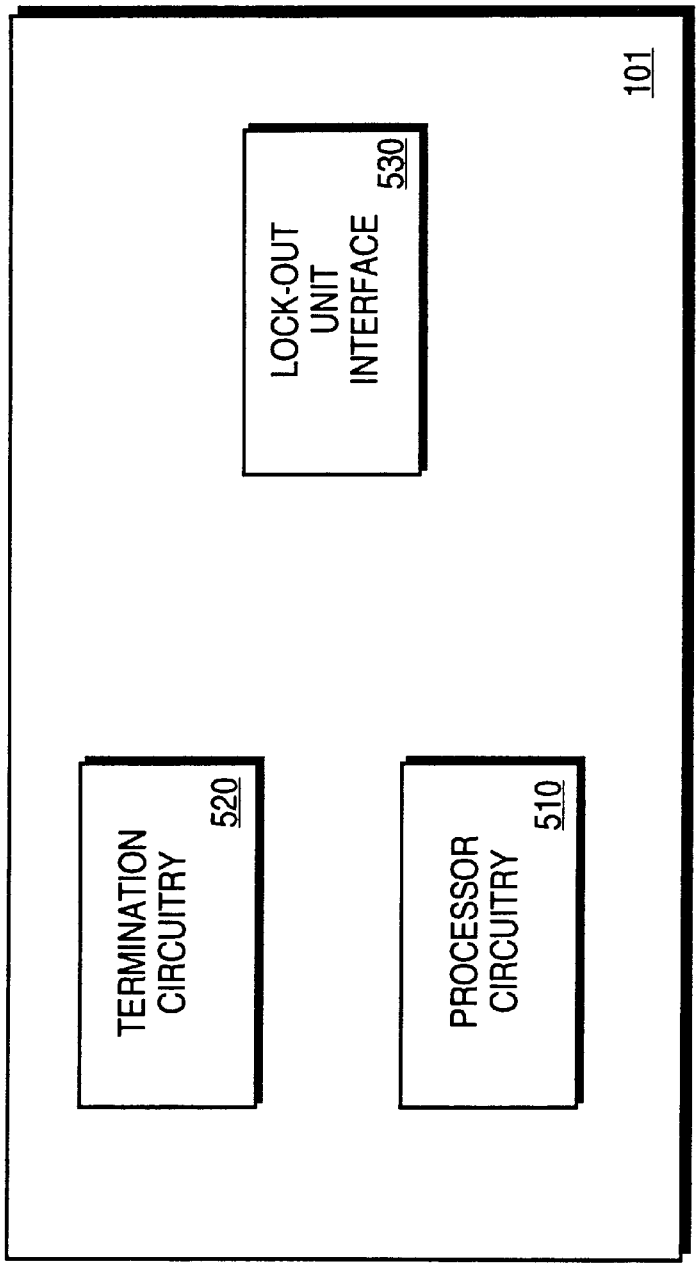
FIG. 5 is a block diagram of a processor cartridge according to the present invention.

FIG. 5 is a block diagram of the processor 101 according to the present invention. The processor 101 is coupled to the computer system 100 (shown in FIG. 1) via the first slot connector 103 (shown in FIG. 1). The first slot connector 103 includes a first slot connector connection (not shown) that routes the first slot occupation connection 401 (shown in FIG. 4) to a first electrical contact (not shown) on the first slot connector 103. The first slot connector 103 includes a second slot connector connection (not shown) that couples a second electrical contact (not shown) on the first slot connector 103 to a ground connection (not shown).

The processor 101 includes processor circuitry 510 that processes digital signals. The processor 101 includes termination circuitry 520 that operates to properly terminate the CPU bus 110 (shown in FIG. 1). According to an embodiment of the processor 101, the termination circuitry 520 is coupled to traces (not shown) that correspond to address, data, and control lines of the CPU bus 110 (shown in FIG. 1). The termination circuitry 520 includes a plurality of resistors (not shown) that operate to pull-up the address, data, and control lines of the CPU bus 110 and to minimize signal reflections at the ends of the traces of the CPU bus 110.

The processor 101 also includes a lock-out unit interface 530. The lock-out unit interface 530 operates to receive a CPU1_SLOTOCC# signal from the first slot occupation connection 401 (shown in FIG. 4) via the first slot connector 103 (shown in FIGS. 1 and 2). The lock-out unit interface 530 returns a CPU1_SLOTOCC# signal on the first slot occupation connection 401 that indicates that the first slot connector 103 is occupied. According to an embodiment of the present invention, the lock-out unit interface 530 includes a signal line that couples the first electrical contact with the second electrical contact on the first slot connector 103 when the processor 101 interfaces with the first slot connector 103

Figure 6:
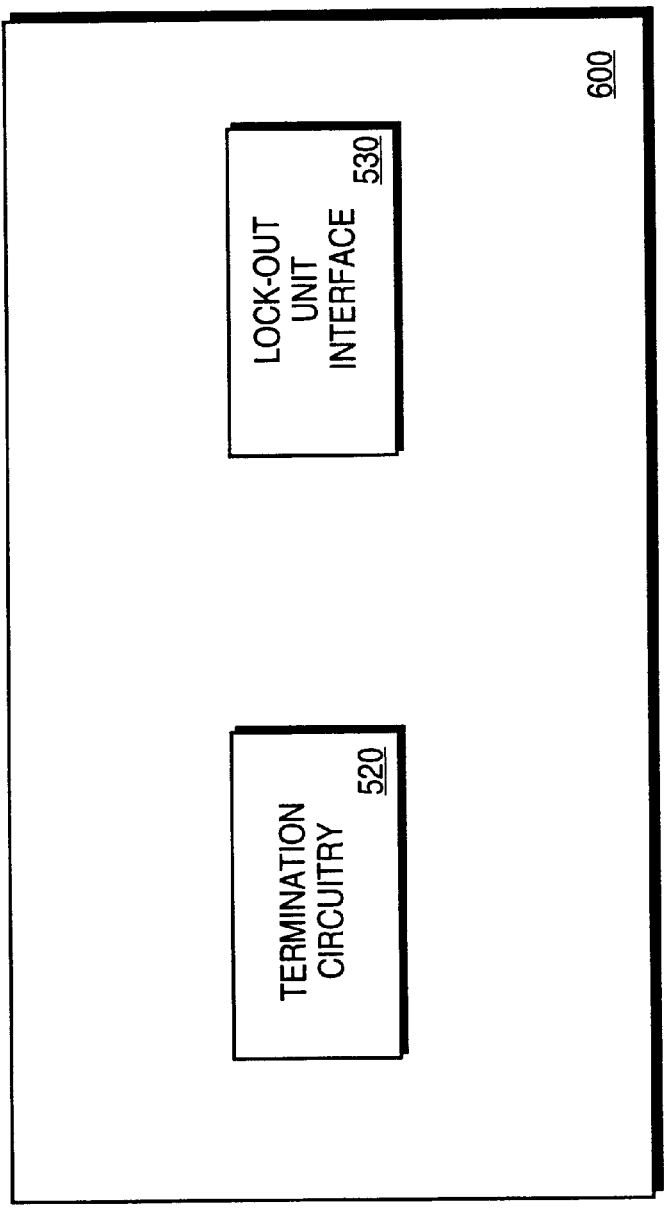
FIG. 6 is a block diagram of a termination card according to the present invention.

FIG. 6 is a block diagram of a termination card 600 according to the present invention. The termination card 600 includes termination circuitry 520 and a lock-out interface 530. The termination circuitry 520 and the lock-out interface 520 operate similarly to the termination circuitry 520 and the lock-out interface 520 described in the processor 101 shown in FIG. 5.

Figure 7:
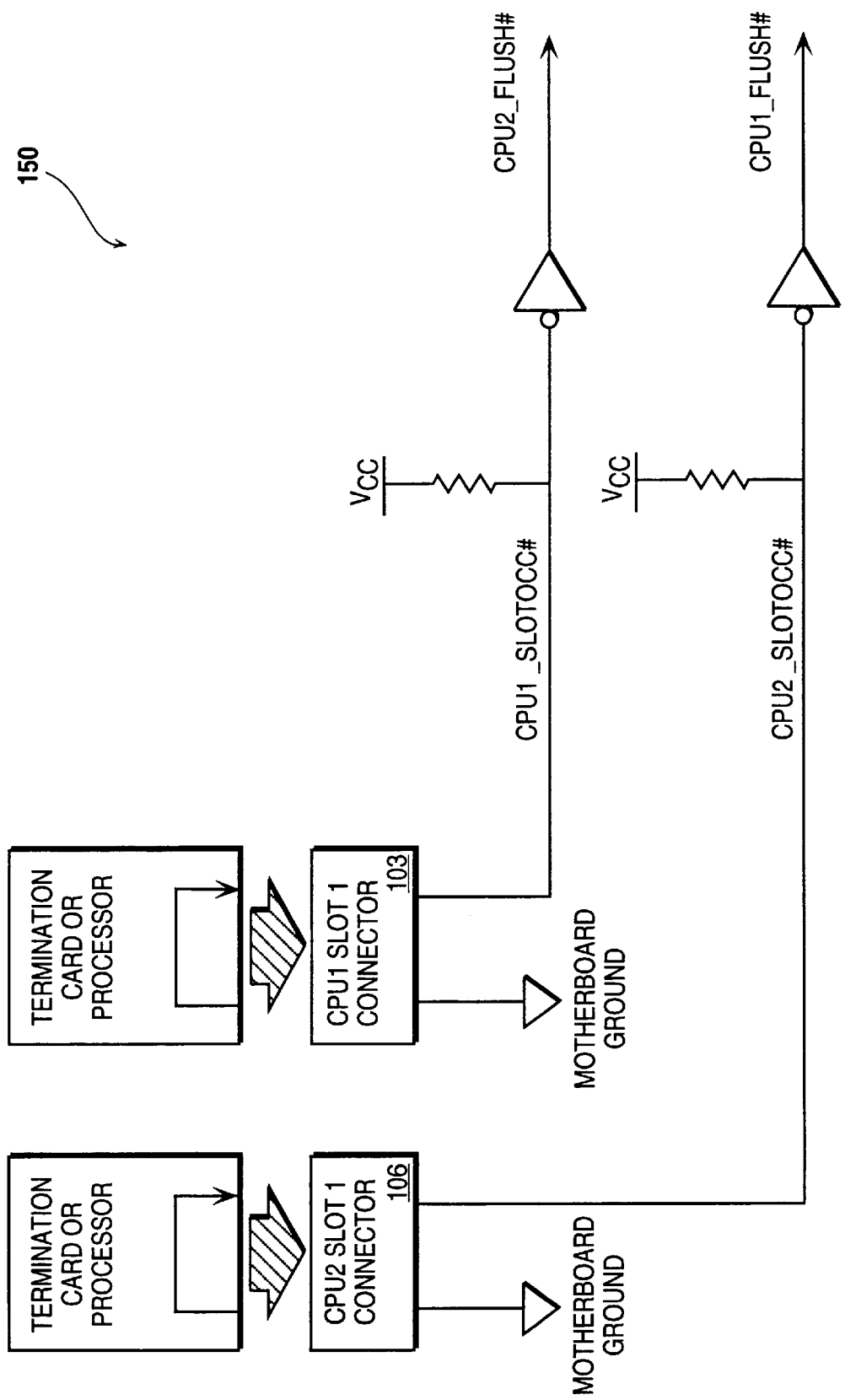
FIG. 7 illustrates a lock-out unit implemented in a computer system according to an embodiment of the present invention.

FIG. 7 illustrates a lock-out unit 150 implemented in a computer system 100 according to an embodiment of the present invention. The lock-out unit 150 in FIG. 7 is shown to be connected to a first slot connector 103 and a second slot connector 106 to determine when one of the slot connectors is vacant and to lock-out a processor coupled to one of the slot connectors if a vacancy occurs. It should be appreciated that the lock-out unit 150 may include additional inverters, pull-up resistors, slot occupation connections, and lock-out connections to monitor additional slot connectors for vacancies.

FIG. 7 illustrates a lock-out unit 150 that monitors the slot connectors of processors. It should be appreciated that the lock-out unit 150 may also be implemented to monitor interfaces of other components coupled to other buses in the computer system for vacancies. For example, the lock-out unit 150 may monitor the socket connectors 220–222 (shown in FIG. 2) of the memory system 113 for vacancies of memory modules. In this embodiment, the lock-out unit 150 transmits a lock-out signal to the computer system 100 when a vacancy on one of the socket connectors 220–222 exists. The computer system 100 may take an appropriate course of action in response to receiving the lock-out signal.

Figure 8:
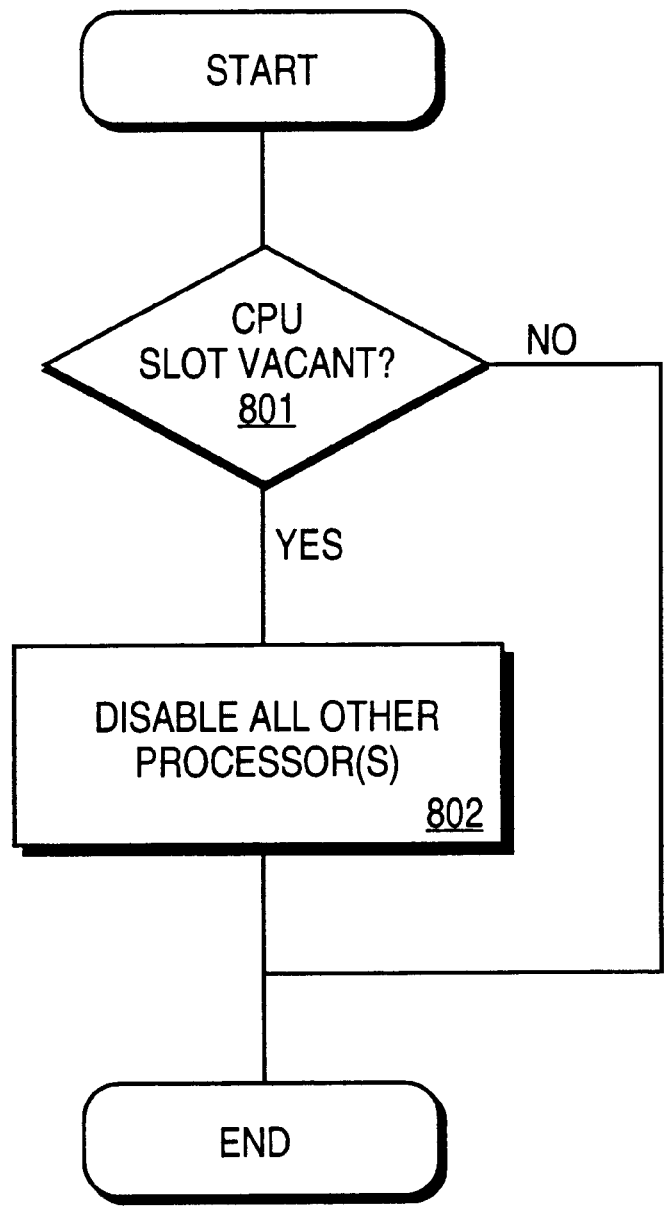
FIG. 8 is a flow chart that illustrates a method for locking out a processor in a computer system with a bus that is improperly terminated.

FIG. 8 is a flow chart that illustrates a method for locking out a processor in a computer system with a bus that is improperly terminated. At step 801, it is determined whether any of a plurality of slot connectors in a computer system is vacant. If a slot connector in the computer system is vacant, control proceeds to step 802. If a slot connector in the computer system is not vacant, control returns to step 801. According to an embodiment of the present invention, determining whether any of the plurality of slot connectors in the computer system is vacant is achieved by monitoring a slot occupation connection corresponding to each of the plurality of slot connectors for a high signal.

At step 802, a processor coupled to one of the plurality of slot connectors is disabled. According to an embodiment of the present invention, disabling the processor coupled to the plurality of slot connectors is achieved by transmitting a lock-out signal to the processor via one of the plurality of slot connectors. The lock-out signal may be transmitted to a pin on the processor that corresponds to a FLUSH# signal or that corresponds to a STOPCLK# signal.

In the foregoing description, the invention is described with reference to specific exemplary embodiments thereof. It will, however, be evident that various modifications and changes may be made thereto without departing from the broader spirit and scope of the present invention as set forth in the appended claims. The specification and drawings are to be regarded in an illustrative rather than a restrictive sense.

What is claimed is:

1. A computer system, comprising:
    a bus;
    a first connector coupled to the bus;
    a first processor coupled to the first connector;
    a second connector coupled to the bus; and
    a lock-out unit, coupled to the first and second connectors, that detects improper termination of the bus when one of a second processor and a termination card is not coupled to the second connector, and disables the first processor in response to the improper termination to prevent operating with corrupted data on the bus due to signal reflections.

2. The computer system of claim 1, wherein the lock-out unit comprises:
    a slot occupation signal generation unit that generates a slot occupation signal in a first state;
    a slot occupation connection that couples the second connector to the slot occupation signal generation unit;
    a lock-out signal generation unit, coupled to the slot occupation connection, that generates a lock-out signal in response to the slot occupation signal in the first state on the slot occupation connection; and
    a lock-out connection, coupled to the lock-out signal generation unit, that transmits the lock-out signal to a pin on the first processor via the first connector.

3. The computer system of claim 2, wherein the pin on the first processor corresponds to a FLUSH# signal.

4. The computer system of claim 2, wherein the pin on the first processor corresponds to a STOPCLK# signal.

5. The computer system of claim 2, wherein the second connector comprises:
    a first connector connection that routes the slot occupation connection to a first electrical contact on the second connector; and
    a second connector connection that couples a second electrical contact on the second connector to a ground connection.

6. The computer system of claim 5, further comprising a termination card comprising a signal line that couples the first electrical contact with the second electrical contact when the termination card interfaces with the second connector.

7. The computer system of claim 5, further comprising a processor comprising a signal line that couples the first electrical contact with the second electrical contact when the processor interfaces with the second connector.

8. The computer system of claim 1, wherein the bus comprises a Gunning Transceiver Logic (GTL+) bus.

9. The lock-out circuit of claim 2, wherein the lock-out signal generation unit comprises an inverter circuit.

10. The lock-out circuit of claim 2, wherein the slot occupation signal generation unit comprises a pull-up resistor connected to a voltage source.

11. The computer system of claim 1, wherein disabling the first processor includes effectuating a shut-down of the first processor.

12. A lock-out unit to prevent corrupted data on a bus, comprising:
- a slot occupation signal generation unit that generates a slot occupation signal;
- a slot occupation connection that couples a first slot connector to the slot occupation signal generation unit;
- a lock-out signal generation unit, coupled to the first slot connector via the slot occupation connection, that generates a lock-out signal in response to improper bus termination indicated by the absence of one of a processor and termination card coupled to the first slot connector; and
- a lock-out connection, coupled to the lock-out signal generation unit, that transmits the lock-out signal to a pin on a second processor via a second connector, wherein the lock-out signal operates to disable the second processor due to the improper termination.

13. The lock-out unit of claim 12, wherein the pin on the second processor corresponds to a FLUSH# signal.

14. The lock-out unit of claim 12, wherein the pin on the second processor corresponds to a STOPCLK# signal.

15. The lock-out unit of claim 12, wherein the lock-out signal generation unit comprises an inverter circuit.

16. The lock-out unit of claim 12, wherein the slot occupation signal generation unit comprises a pull-up resistor connected to a voltage source.

17. The computer system of claim 12, wherein disabling the second processor includes effectuating a shut-down of the second processor.

18. A method for preventing corrupted data on a bus, comprising:
- detecting improper termination of a bus by determining whether any of a plurality of connectors coupled to the bus is vacant; and
- disabling a processor coupled to one of the plurality of connectors by transmitting a lock-out signal to the processor when any of the plurality of connectors is vacant.

19. The method of claim 18, wherein determining whether any of the plurality of connectors coupled to the bus is vacant comprises monitoring a slot occupation connection corresponding to each of the plurality of connectors for a signal at a first state indicating the presence of one of a processor and a termination card.

20. The method of claim 19, wherein transmitting the lock-out signal to the processor comprises transmitting the lock-out signal to a pin on the processor that corresponds to a FLUSH# signal.

21. The method of claim 19, wherein transmitting the lock-out signal to the processor comprises transmitting the lock-out signal to a pin on the processor that corresponds to a STOPCLK# signal.

22. The computer system of claim 18, wherein disabling the processor includes effectuating a shut-down of the processor.

* * * * *